United States Patent
Sun et al.

(10) Patent No.: US 10,552,993 B2
(45) Date of Patent: Feb. 4, 2020

(54) DETECTING METHOD AND SYSTEM FOR TOUCH APPARATUS

(71) Applicant: Acer Incorporated, New Taipei (TW)

(72) Inventors: Chia-Yu Sun, New Taipei (TW); Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 373 days.

(21) Appl. No.: 15/495,119

(22) Filed: Apr. 24, 2017

(65) Prior Publication Data

US 2018/0196535 A1   Jul. 12, 2018

(30) Foreign Application Priority Data

Jan. 9, 2017   (TW) .............................. 106100581 A

(51) Int. Cl.
| | |
|---|---|
| *G01D 3/00* | (2006.01) |
| *G06T 11/20* | (2006.01) |
| *G06F 11/22* | (2006.01) |
| *G06F 3/041* | (2006.01) |

(52) U.S. Cl.
CPC ............ *G06T 11/20* (2013.01); *G06F 3/0418* (2013.01); *G06F 11/2221* (2013.01)

(58) Field of Classification Search
CPC ..... G06T 11/20; G06F 3/0418; G06F 11/2221
USPC ....................................................... 702/108
See application file for complete search history.

(56) References Cited

U.S. PATENT DOCUMENTS

| | | | | |
|---|---|---|---|---|
| 2005/0073507 A1* | 4/2005 | Richter | ................... | G06F 3/044 345/174 |
| 2007/0034423 A1* | 2/2007 | Rebeschi | .............. | G06F 3/0416 178/18.06 |
| 2008/0192041 A1* | 8/2008 | Ho | ....................... | G09G 3/3677 345/212 |

FOREIGN PATENT DOCUMENTS

| | | |
|---|---|---|
| CN | 102841715 | 12/2012 |
| CN | 105404417 | 3/2016 |
| TW | I228233 | 2/2005 |
| TW | M268660 | 6/2005 |
| TW | M268862 | 6/2005 |
| TW | M269505 | 7/2005 |

* cited by examiner

*Primary Examiner* — Toan M Le
*Assistant Examiner* — Xiuqin Sun
(74) *Attorney, Agent, or Firm* — J.C. Patents

(57) ABSTRACT

Detecting method and system for a touch apparatus are provided. A testing signal is outputted to a power supply apparatus by a signal generator, and a line drawing trajectory, which is generated by an automatic line drawing apparatus drawing lines on the touch apparatus, is collected when power with the testing signal is supplied to the touch apparatus by the power supply apparatus. Next, whether the testing signal passes a frequency interference test is determined based on the line drawing trajectory.

10 Claims, 4 Drawing Sheets

DETECTING METHOD AND SYSTEM FOR TOUCH APPARATUS

CROSS-REFERENCE TO RELATED APPLICATION

This application claims the priority benefit of Taiwan application serial no. 106100581, filed on Jan. 9, 2017. The entirety of the above-mentioned patent application is hereby incorporated by reference herein and made a part of this specification.

BACKGROUND OF THE INVENTION

1. Field of the Invention

The invention elates to a mechanism for detecting interference signal sources, and more particularly, to detecting method and system for a touch apparatus.

2. Description of Related Art

In general, the touch apparatus is provided with two or more than two working frequencies in order to accomplish an automatic frequency-hopping mechanism. Said mechanism aims to prevent the touch apparatus from malfunctions due to the working frequencies of the touch apparatus interfered by power noises. Thus, when the touch apparatus is interfered by the noises, such mechanism will be automatically activated so the touch apparatus can work normally.

However, detecting whether the touch apparatus is provided with such mechanism requires manually operating the touch apparatus repeatedly, switching between the interference signal sources until an interference frequency is found, and confirming whether the working frequencies are being automatically switched. For example, a signal generator may be used to simulate the interference signal sources with various waveforms, voltages and frequencies, and input those interference signal sources to a power supply socket of the touch apparatus.

The testing approach involves a tester who needs to find a frequency band of an interference source by constantly switching between the frequencies and operating the touch apparatus. Because the tester can only manually conduct scanning one by one with a larger frequency interval since a range of the frequency band is very large, not all the frequency bands can be scanned carefully. Accordingly, some of the working frequencies cannot be found, and worse yet, a considerable amount of time may be wasted.

SUMMARY OF THE INVENTION

The invention is directed to detecting method and system for a touch apparatus, which are capable of detecting whether a touch IC (integrated circuit) in the touch apparatus is provided with the automatic frequency-hopping mechanism so as to further find all the working frequencies of the touch IC.

The detecting method for the touch apparatus of the invention includes: outputting a testing signal to a power supply apparatus by a signal generator; collecting a line drawing trajectory generated by an automatic line drawing apparatus drawing lines on the touch apparatus when power with the testing signal is supplied to the touch apparatus by the power supply apparatus; and determining whether the testing signal passes a frequency interference test based on the line drawing trajectory.

In an embodiment of the invention, aforesaid detecting method further includes: controlling both the signal generator and the automatic line drawing apparatus to operate simultaneously by a master apparatus. In the synchronized operation, the master apparatus transmits a signal generating command to the signal generator based on a frequency scanning interval so the signal generator outputs the testing signal to the power supply apparatus; and the master apparatus transmits a line drawing control command to the automatic line drawing apparatus so the automatic line drawing apparatus draws lines on the touch apparatus when power with the testing signal is supplied to the touch apparatus by the power supply apparatus.

In an embodiment of the invention, aforesaid detecting method further includes: transmitting a first notification to the master apparatus by the touch apparatus; transmitting the signal generating command to the signal generator based on the frequency scanning interval after the first notification is received by the master apparatus so the signal generator outputs the corresponding testing signal based on the received signal generating command; transmitting a second notification to the master apparatus after the touch apparatus confirms that power with the testing signal is received from the power supply apparatus; and transmitting a line drawing control command to the automatic line drawing apparatus after the second notification is received by the master apparatus so the automatic line drawing apparatus draws lines on the touch apparatus when power with the testing signal is supplied to the touch apparatus by the power supply apparatus.

In an embodiment of the invention, the step of transmitting the signal generating command to the signal generator based on the frequency scanning interval so the signal generator outputs the testing signal to the power supply apparatus further includes controlling the signal generator to set at least one of a waveform, a frequency and an amplitude of the testing signal by the master apparatus.

In an embodiment of the invention, after collecting the line drawing trajectory generated by the automatic line drawing apparatus drawing lines on the touch apparatus, the method further includes recording the line drawing trajectory; and clearing the line drawing trajectory displayed on the touch apparatus.

In an embodiment of the invention, the step of determining whether the testing signal passes the frequency interference test based on the line drawing trajectory includes: obtaining a plurality of point coordinates information based on the line drawing trajectory; determining whether the point coordinates information meet a predefined criterion; determining that the testing signal is not a working frequency of the touch IC in the touch apparatus and thus will not affect the touch apparatus (i.e., passes the frequency interference test) if the point coordinates information meet the predefined criterion; and determining that the testing signal is the working frequency of the touch IC in the touch apparatus and thus will affect the touch apparatus (i.e., fails to pass the frequency interference test) if the point coordinates information fail to meet the predefined criterion.

In an embodiment of the invention, after whether the testing signal passes the frequency interference test based on the line drawing trajectory is determined, a result of the frequency interference test is recorded.

The detecting system for the touch apparatus of the invention includes: a touch apparatus, a power supply apparatus, an automatic line drawing apparatus, a signal generator and a master apparatus. The power supply apparatus is configured to supply power to the touch apparatus. The automatic line drawing apparatus is configured to draw lines on the touch apparatus. The signal generator is coupled to the power supply apparatus, and outputs a testing signal to the power supply apparatus. The master apparatus is coupled to the touch apparatus, the automatic line drawing apparatus and the signal generator, and controls both the signal generator and the automatic line drawing apparatus to operate simultaneously. The master apparatus drives the signal generator to output the testing signal to the power supply apparatus. Further, the master apparatus drives the automatic line drawing apparatus so the automatic line drawing apparatus draws lines on the touch apparatus when power with the testing signal is supplied to the touch apparatus by the power supply apparatus. The touch apparatus collects a line drawing trajectory generated by the automatic line drawing apparatus, and determines whether the testing signal passes a frequency interference test based on the line drawing trajectory.

Based on the above, the invention utilizes the master apparatus to simultaneously control the signal generator and the automatic line drawing apparatus, and set a frequency scanning interval based on actual requirements so as automatically switching between multiple testing signals. As a result, a variety of testing signals can be set as the interference signal sources to find the interference frequency more accurately, save labor costs and automatically generate a result.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
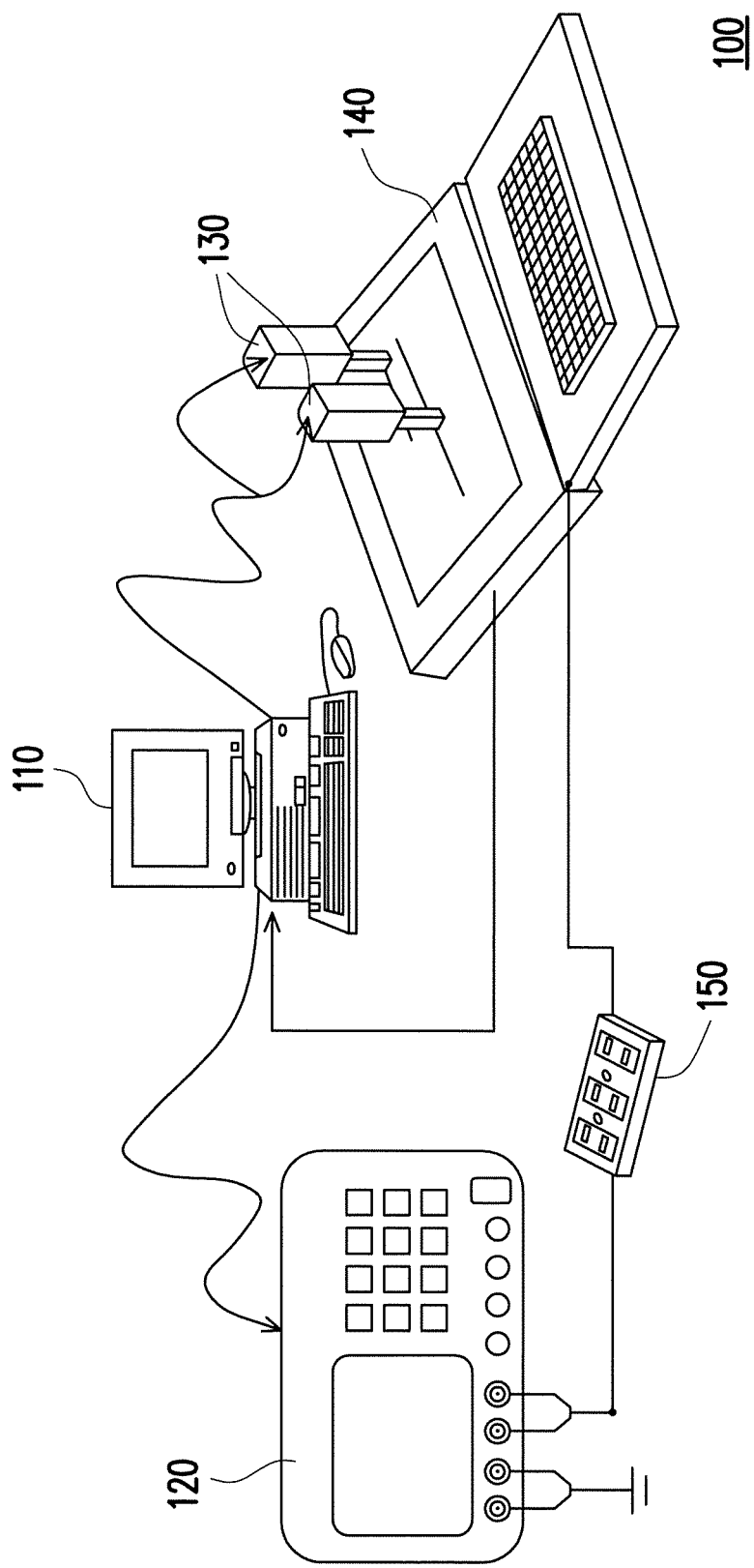
FIG. 1 is a schematic diagram of a detecting system for a touch apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a detecting system for a touch apparatus according to an embodiment of the invention. A detecting system 100 includes a master apparatus 110, a signal generator 120, an automatic line drawing apparatus 130, a touch apparatus 140 and a power supply apparatus 150. Here, the master apparatus 110 is coupled to the signal generator 120, the automatic line drawing apparatus 130 and the touch apparatus 140. The signal generator 120 is coupled to the power supply apparatus 150.

For example, the master apparatus 110 is connected to the signal generator 120 via the USB (Universal Serial Bus) and is connected to the automatic line drawing apparatus 130 via the RS232 interface. In addition, the touch apparatus 140 is connected to the master apparatus 110 through a wired or wireless transmission using, for example, the RDP (Remote Desktop Protocol). A signal output terminal of the signal generator 120 is coupled to a power supply socket of the power supply apparatus 150 so as to use a testing signal generated by the signal generator 120 as an interference signal source. The power supply apparatus 150 is coupled to a power input terminal of the touch apparatus 140 to supply power with the testing signal to the touch apparatus 140.

The master apparatus 110 is, for example, an electronic apparatus with computing capabilities, such as a desktop PC, a notebook PC and a tablet PC, which are configured to control the signal generator 120 and the automatic line drawing apparatus 130 so both of them can operate simultaneously. The signal generator 120 is configured to generate the testing signal with various different waveforms, voltages and frequencies, and provide the testing signal to the power supply apparatus 150. The automatic line drawing apparatus 130 is, for example, a two-finger touch line drawing apparatus configured to draw lines on the touch apparatus 140. In other embodiments, the automatic line drawing apparatus 130 may also be a single-finger or multi-finger touch line drawing apparatus.

The touch apparatus 140 is an electronic apparatus with a touch IC. The touch IC may be a capacitive type, a resistive type, an infrared type or an acoustic wave type, and configured to receive input signals from a contact tip (including a finger or a plastic pen tip).

The detecting system 100 utilizes the master apparatus 110 to simultaneously control the signal generator 120 and the automatic line drawing apparatus 130 and store all the related line drawing trajectories and point coordinates information generated by touch control, so that whether the corresponding testing signal can induce interferences may be determined according to the point coordinates information.

In addition to a control software installed for the automatic line drawing apparatus 130 (an automatic line drawing apparatus control module), the master apparatus 110 is further installed with a driver program for the signal generator 120 and an application (a signal generator control module) so the signal generator 120 can be controlled (e.g., through the connection via the USB) to generate a variety of testing signals. The touch apparatus 140 utilizes the RDP to connect the master apparatus 110 and control the master apparatus 110. A master program is installed on the touch apparatus 140 to accomplish overall control for the detecting system 100. An embodiment is given for illustration below.

Figure 2:
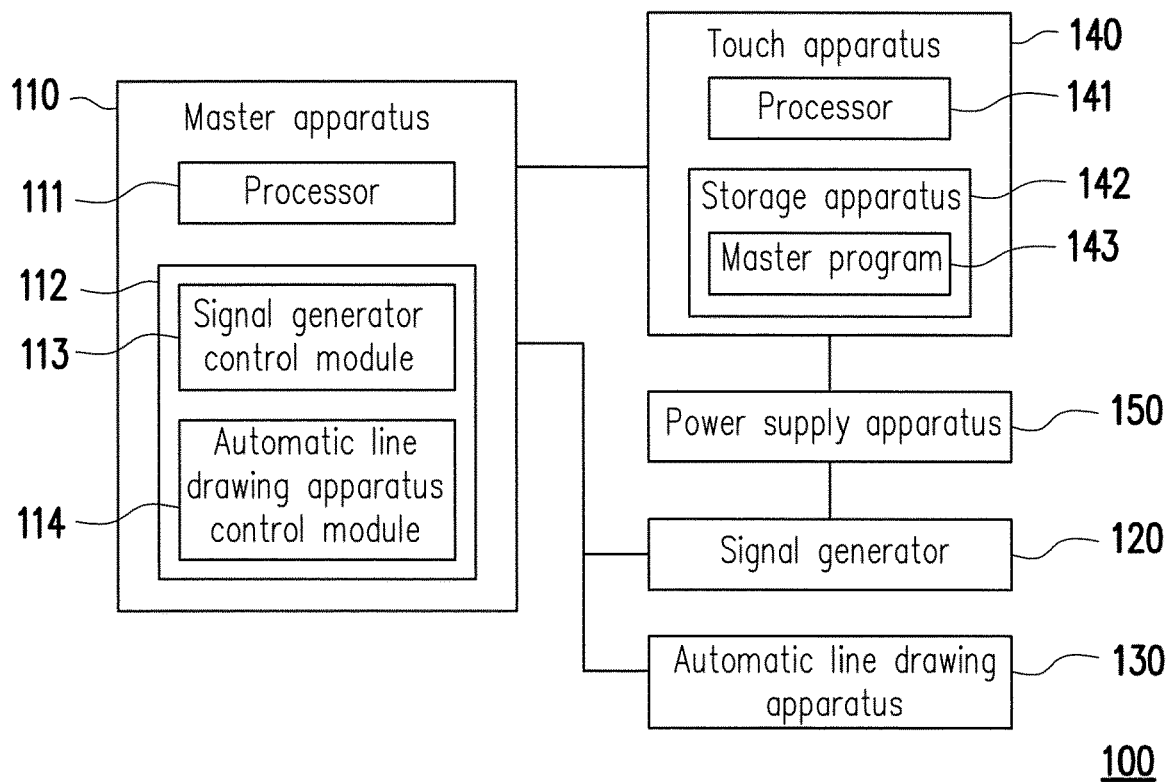
FIG. 2 is a block diagram of a detecting system for a touch apparatus according to an embodiment of the invention.

FIG. 2 is a block diagram of a detecting system for a touch apparatus according to an embodiment of the invention. With reference to FIG. 2, the master apparatus 110 includes a processor 111 and a storage apparatus 112. The storage apparatus 112 is stored with the driver program for the signal generator 120, a signal generator control module 113 corresponding to the signal generator 120, a driver program for the automatic line drawing apparatus 130 and an automatic line drawing apparatus control module 114 corresponding to the automatic line drawing apparatus 130. The signal generator control module 113 and the automatic line drawing apparatus control module 114 are executed by the processor 111.

The touch apparatus 140 includes a processor 141 and a storage apparatus 142. A master program 143 is stored in the storage apparatus 142. The processor 141 executes the master program 143 to control the signal generator control module 113 and the automatic line drawing apparatus control module 114. For example, the master program 143 transmits a notification to the processor 111 of the master apparatus 110 so the processor 111 can start driving the signal generator control module 113 and the automatic line drawing apparatus 114.

Said processor 111 (or 141) is, for example, a CPU (Central Processing Unit), a GPU (Graphic Processing Unit), a PPU (Physics Processing Unit), a microprocessor, an embedded control chip, a DSP (PPU), an ASIC (Application Specific Integrated Circuits) or other similar devices.

The storage apparatus 112 (or 142) is, for example, any fixed or a movable device including a RAM (Random Access Memory), a ROM (Read-Only Memory), a flash memory, a hard drive or other similar devices, or a combination of the above-mentioned devices.

The present embodiment is merely an implementation of the detecting system 100, and the invention is not limited thereto. For example, in other embodiments, it is also possible that the master program 143 is provided in the master apparatus 110 and the master apparatus 110 is connected to the touch apparatus 140 via the Internet.

Figure 3:
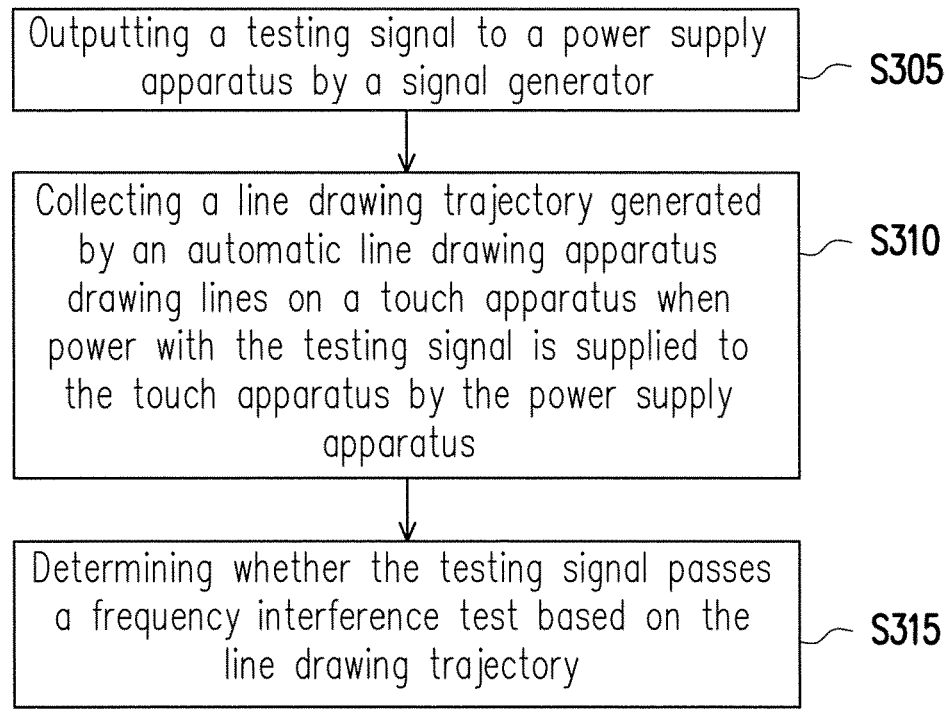
FIG. 3 is a flowchart of a detecting method for a touch apparatus according to an embodiment of the invention.

FIG. 3 is a flowchart of a detecting method for a touch apparatus according to an embodiment of the invention. Referring to FIG. 1 and FIG. 3 together, the present embodiment describes operations of the touch apparatus 140 as follows. The touch apparatus 140 utilizes the master apparatus 110 to control both the signal generator 120 and the automatic line drawing apparatus 130 to operate simultaneously.

In step S305, a testing signal is outputted to the power supply apparatus 150 by the signal generator 120. Further, in step S310, a line drawing trajectory generated by the automatic line drawing apparatus 130 drawing lines on the touch apparatus 140 is collected when power with the testing signal is supplied to the touch apparatus 140 by the power supply apparatus 150. Specifically, the master apparatus 110 transmits a signal generating command and a line drawing control command to the signal generator 120 and the automatic line drawing apparatus 130 respectively so the automatic line drawing apparatus 130 draws lines on the touch apparatus 140 when the testing signal is outputted to the power supply apparatus 150 by the signal generator 120.

Next, in step S315, the touch apparatus 140 determines whether the testing signal passes a frequency interference test based on the line drawing trajectory. For instance, the touch apparatus 140 obtains a plurality of point coordinates information (crack points information) based on the line drawing trajectory. Next, whether the point coordinates information meet a predefined criterion is determined. If the point coordinates information meet the predefined criterion, the touch apparatus 140 determines that the testing signal passes the frequency interference test. This means that the testing signal is not a working frequency of the touch IC in the touch apparatus 140 and thus such testing signal will not affect the touch apparatus 140. If the point coordinates information fail to meet the predefined criterion, the touch apparatus 140 determines that the testing signal fails to pass the frequency interference test. This means that the testing signal is the working frequency of the touch IC in the touch apparatus 140 and thus such testing signal will affect the touch apparatus 140.

Figure 4A:
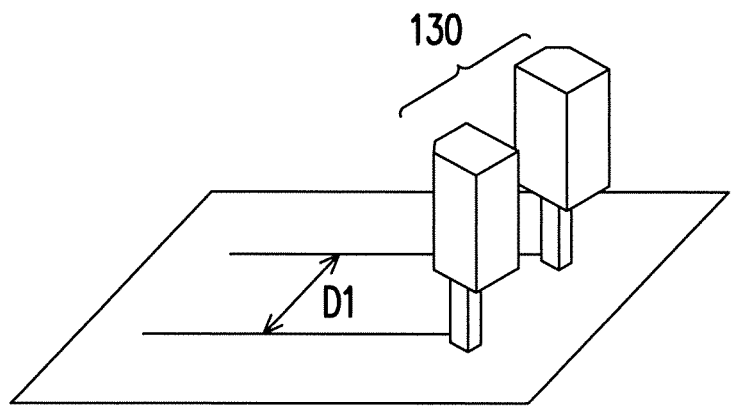
FIG. 4A and FIG. 4B are schematic diagrams of a line drawing trajectory according to an embodiment of the invention.
Figure 4B:
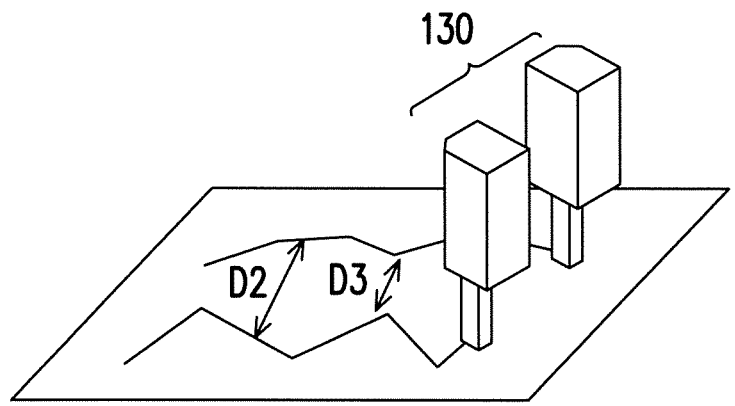

FIG. 4A and FIG. 4B are schematic diagrams of a line drawing trajectory according to an embodiment of the invention. In FIG. 4A and FIG. 4B, description is provided using the two-finger touch line drawing apparatus 130 as an example.

With reference to FIG. 4A, two line segments drawn by the automatic line drawing apparatus 130 and collected by the touch apparatus 140 are line segments substantially in parallel, and the two line segments are separated by a distance D1. Next, the touch apparatus 140 determines whether the distance D1 falls within a predetermined range (i.e., the predefined criterion). If the distance D1 falls within the predetermined range ($D_{down}<D1<D_{up}$), it is determined that the testing signal currently received by the touch apparatus 140 passes the frequency interference test. If the distance D1 does not fall within the predetermined range, it is determined that the testing signal currently received by the touch apparatus 140 fails to pass the frequency interference test.

With reference to FIG. 4B, two line segments drawn by the automatic line drawing apparatus 130 and collected by the touch apparatus 140 are irregular curves where a maximum distance D2 and a minimum distance D3 between the two curves are obtained. Next, the touch apparatus 140 determines whether the maximum distance D2 falls within the predetermined range and determines whether the minimum distance D3 also falls within the predetermined range. If the maximum distance D2 and the minimum distance D3 both fall within the predetermined range, it is determined that the testing signal currently received by the touch apparatus 140 passes the frequency interference test. If either the maximum distance D2 or the minimum distance D3 does not fall within the predetermined range, it is determined that the testing signal currently received by the touch apparatus 140 fails to pass the frequency interference test.

In other embodiments, the touch apparatus 140 may also transmit the point coordinates information (crack points information) obtained from a touch line drawing performed by the automatic line drawing apparatus 130 to the master apparatus 110 for computations, which are not particularly limited by the invention.

Figure 5:
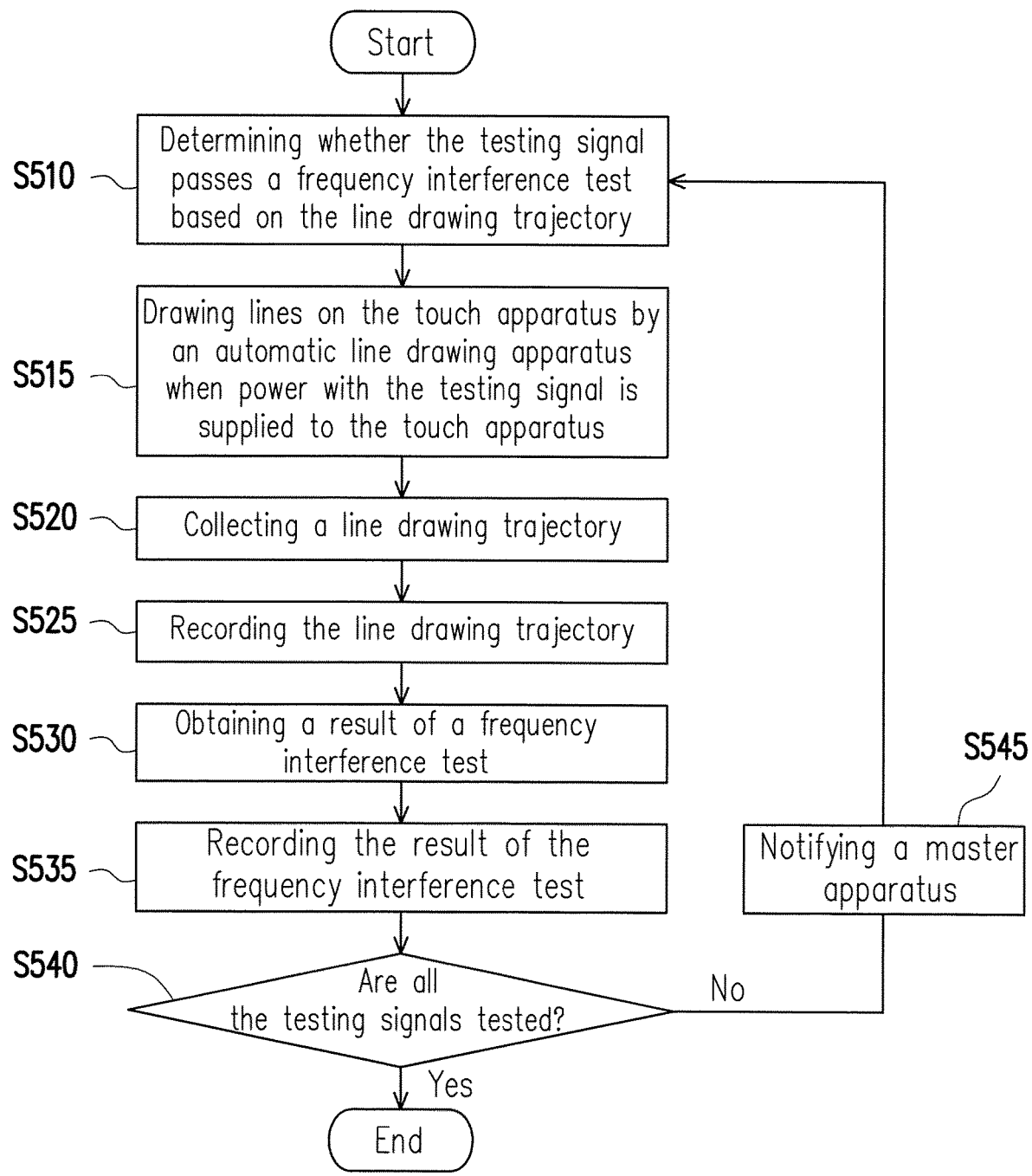
FIG. 5 is a flowchart of a detecting method for a touch apparatus according to another embodiment of the invention.

FIG. 5 is a flowchart of a detecting method for a touch apparatus according to another embodiment of the invention. When the detection starts, the signal generator 120, the automatic line drawing apparatus 130 and the touch apparatus 140 are connected to the master apparatus 110.

Herein, the master apparatus 110 is utilized to set a frequency scanning interval and transmit the signal generating command to the signal generator 120 based on the frequency scanning interval. Specifically, each time the master apparatus 110 transmits one signal generating command to the signal generator 120 so the signal generator 120 outputs the corresponding testing signal based on such signal generating command. Among the multiple testing signals outputted based on the different signal generating commands, at least one of a waveform, a frequency and an amplitude of one testing signal is different from the others.

Moreover, in other embodiments, the master program 143 of the touch apparatus 140 may also be used to set the frequency scanning interval and transmit the notification to the master apparatus 110 so the master apparatus 110 outputs the corresponding signal generating command to the signal generator 120 based on the frequency scanning interval.

The master apparatus 110 transmits the signal generating command and the line drawing control command to the signal generator 120 and the automatic line drawing apparatus 130 respectively. After the signal generating command is received by the signal generator 120, the signal generator 120 outputs the testing signal to the power supply apparatus 150 in step S510. Further, after the line drawing control command is received by the automatic line drawing apparatus 130, the automatic line drawing apparatus 130 draws lines on the touch apparatus 140 when power with the testing signal is supplied to the touch apparatus 140 in step S515.

Specifically, a first notification may be transmitted to the master apparatus 110 by the touch apparatus 140. After receiving the first notification, the master apparatus 110 transmits the signal generating command to the signal generator 120 based on the frequency scanning interval so the signal generator 120 outputs the corresponding testing signal based on the received signal generating command. The signal generating command includes setting parameters such as the frequency, the waveform and the amplitude. After confirming that power with the testing signal is received, the touch apparatus 140 transmits a second notification to the master apparatus 110. After receiving the second notification, the master apparatus 110 transmits the line drawing control command to the automatic line drawing apparatus 130 so the automatic line drawing apparatus 130 draws lines on the touch apparatus 140 when power with the testing signal is supplied to the touch apparatus 140 by the power supply apparatus 150.

Next, in step S520, a line drawing trajectory is collected by the touch apparatus 140. Further, in step S525, the line drawing trajectory is recorded by the touch apparatus 140. Then, in step S530, a result of a frequency interference test is obtained by the touch apparatus 140. The touch apparatus 140 determines whether the testing signal passes the frequency interference test based on the line drawing trajectory. For example, the touch apparatus 140 obtains the multiple point coordinates information based on the point coordinates information (crack points information), and thereby determines whether the point coordinates information meet the redefined criterion. Then, in step S535, the result of the frequency interference test is recorded. In addition, after the line drawing trajectory is recorded, the processor 141 of the touch apparatus 140 clears the line drawing trajectory displayed on the touch apparatus 140. Then, in step S540, whether all the testing signals are tested is determined. If yes, the detection ends. If no, the touch apparatus 140 notifies the master apparatus 110 so the master apparatus 110 continues to transmit the signal generating command to the signal generator 120 based on the frequency scanning interval and transmit the line drawing control command to the automatic line drawing apparatus 130.

After going through steps S510 to S545, a final result of the frequency interference test may be obtained, for example, as shown by Table 1 below. In view of Table 1, the working frequencies of the touch apparatus 140 are 100 KHz and 150 KHz.

TABLE 1

| Testing signal | Result | Testing signal | Result |
|---|---|---|---|
| Sin20V10kHz | Pass | Squ20V10kHz | Pass |
| Sin20V20kHz | Pass | Squ20V20kHz | Pass |
| . . . | Pass | . . . | Pass |
| Sin20V80kHz | Pass | Squ20V80kHz | Pass |
| Sin20V90kHz | Pass | Squ20V90kHz | Pass |

TABLE 1-continued

| Testing signal | Result | Testing signal | Result |
|---|---|---|---|
| Sin20V100kHz | Fail | Squ20V100kHz | Fail |
| Sin20V110kHz | Pass | Squ20V110kHz | Pass |
| Sin20V120kHz | Pass | Squ20V120kHz | Pass |
| Sin20V130kHz | Pass | Squ20V130kHz | Pass |
| Sin20V140kHz | Pass | Squ20V140kHz | Pass |
| Sin20V150kHz | Fail | Squ20V150kHz | Fail |
| Sin5V500kHz | Pass | Squ5V500kHz | Pass |
| Sin5V1000kHz | Pass | Squ5V1000kHz | Pass |

In summary, by utilizing the master apparatus to simultaneously control the signal generator and the automatic line drawing apparatus, switching between multiple testing signals may also automatically performed. The master apparatus may also be utilized to set the frequency scanning interval and adjust the waveform and the amplitude of the testing signal—that is, a variety of testing signals can be set by freely changing the waveform, the amplitude and the frequency to be detected so as to improve a usage flexibility and reduce a testing time. Accordingly, because the frequency interval is reduced, the interference frequency can be accurately measured so the problem that the interference frequency cannot be accurately found due to the range of the frequency band being overly larger in the manual testing can be solved. Further, whether the touch IC in the touch apparatus is provided with the automatic frequency-hopping mechanism may be confirmed through the foregoing embodiments. Moreover, the automatic line drawing apparatus may be modified to a ten-finger type in order to accomplish a ten-finger input measurement, which cannot be accomplished by manually testing. Nevertheless, this automatic detection can be utilized to save labor costs and automatically generate the result.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A detecting method for a touch apparatus, comprising:
outputting a testing signal to a power supply apparatus by a signal generator;
collecting a line drawing trajectory generated by an automatic line drawing apparatus drawing lines on the touch apparatus when power with the testing signal is supplied to the touch apparatus by the power supply apparatus;
controlling both the signal generator and the automatic line drawing apparatus to operate simultaneously by a master apparatus, comprising:
transmitting a first notification to the master apparatus by the touch apparatus;
transmitting a signal generating command to the signal generator based on a frequency scanning interval after the first notification is received by the master apparatus so the signal generator outputs the corresponding testing signal based on the received signal generating command;
transmitting a second notification to the master apparatus after the touch apparatus confirms that power with the testing signal is received from the power supply apparatus; and transmitting a line drawing control command to the automatic line drawing apparatus after the second notification is received by the master apparatus so the automatic line drawing apparatus draws lines on the touch apparatus when power with the testing signal is supplied to the touch apparatus by the power supply apparatus; and determining whether the testing signal passes a frequency interference test based on the line drawing trajectory.

2. The detecting method for the touch apparatus according to claim 1, wherein the step of transmitting the signal generating command to the signal generator based on the frequency scanning interval so the signal generator outputs the testing signal to the power supply apparatus further comprises:

controlling the signal generator to set at least one of a waveform, a frequency and an amplitude of the testing signal by the master apparatus.

3. The detecting method for the touch apparatus according to claim 1, wherein after collecting the line drawing trajectory generated by the automatic line drawing apparatus drawing lines on the touch apparatus, the method further comprises:

recording the line drawing trajectory; and clearing the line drawing trajectory displayed on the touch apparatus.

4. The detecting method for the touch apparatus according to claim 1, wherein the step of determining whether the testing signal passes the frequency interference test based on the line drawing trajectory comprises:

obtaining a plurality of point coordinates information based on the line drawing trajectory;

determining whether the point coordinates information meet a predefined criterion;

determining that the testing signal passes the frequency interference test if the point coordinates information meet the predefined criterion; and determining that the testing signal fails to pass the frequency interference test if the point coordinates information fail to meet the predefined criterion.

5. The detecting method for the touch apparatus according to claim 1, wherein after the step of determining whether the testing signal passes the frequency interference test based on the line drawing trajectory, the method further comprises:

recording a result of the frequency interference test.

6. A detecting system for a touch apparatus, comprising:

a touch apparatus;

a power supply apparatus, supplying power to the touch apparatus;

an automatic line drawing apparatus, drawing lines on the touch apparatus;

a signal generator, coupled to the power supply apparatus, and outputting a testing signal to the power supply apparatus; and a master apparatus, coupled to the touch apparatus, the automatic line drawing apparatus and the signal generator, and controlling both the signal generator and the automatic line drawing apparatus to operate simultaneously;

wherein the master apparatus drives the signal generator to output the testing signal to the power supply apparatus, and the master apparatus drives the automatic line drawing apparatus so the automatic line drawing apparatus draws lines on the touch apparatus when power with the testing signal is supplied to the touch apparatus by the power supply apparatus;

the touch apparatus collects a line drawing trajectory generated by the automatic line drawing apparatus, and determines whether the testing signal passes a frequency interference test based on the line drawing trajectory, wherein the master apparatus transmits a signal generating command to the signal generator based on a frequency scanning interval after receiving a first notification from the master apparatus so the signal generator outputs the corresponding testing signal based on the received signal generating command;

the touch apparatus transmits a second notification to the master apparatus after confirming that power with the testing signal is received from the power supply apparatus, and the master apparatus transmits a line drawing control command to the automatic line drawing apparatus after receiving the second notification so the automatic line drawing apparatus draws lines on the touch apparatus when power with the testing signal is supplied to the touch apparatus by the power supply apparatus.

7. The detection system for the touch apparatus according to claim 6, wherein the touch apparatus records the line drawing trajectory after collecting the line drawing trajectory; and the touch apparatus clears the line drawing trajectory displayed on the touch apparatus.

8. The detection system for the touch apparatus according to claim 6, wherein the touch apparatus captures an image of the line drawing trajectory, obtains a plurality of point coordinates information from the image and determines whether the point coordinates information meet a predefined criterion; the touch apparatus determines that the testing signal passes the frequency interference test if the point coordinates information meet the predefined criterion; the touch apparatus determines that the testing signal fails to pass the frequency interference test if the point coordinates information fail to meet the predefined criterion.

9. The detection system for the touch apparatus according to claim 6, wherein the touch apparatus captures an image of the line drawing trajectory and transmits the image to the master apparatus, the master apparatus obtains a plurality of point coincidences information from the image, and the master apparatus determines whether the point coordinates information meet a predefined criterion; the master apparatus determines that the testing signal passes the frequency interference test if the point coordinates information meet the predefined criterion; the master apparatus determines that the testing signal fails to pass the frequency interference test if the point coordinates information fail to meet the predefined criterion.

10. The detection system for the touch apparatus according to claim 6, wherein the master apparatus controls the signal generator to set at least one of a waveform, a frequency and an amplitude of the testing signal.

* * * * *